Feb. 10, 1931. P. FAVOUR 1,791,893
ACCESSORY FOR PHOTOGRAPHIC FILMS
Original Filed March 1, 1928   2 Sheets-Sheet 1
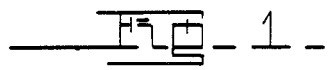
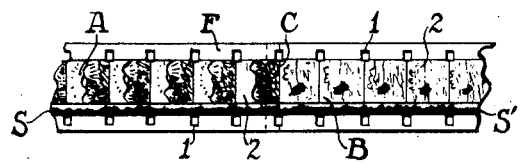
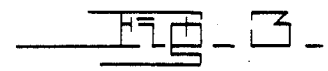
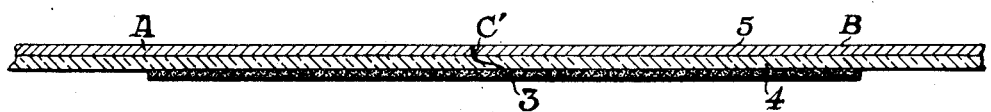
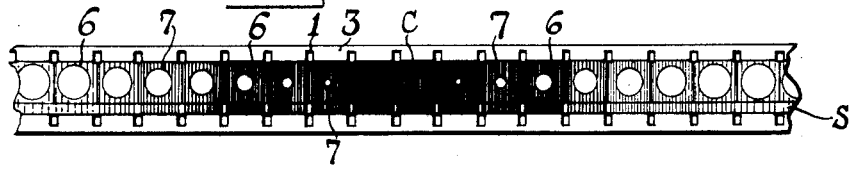
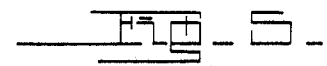
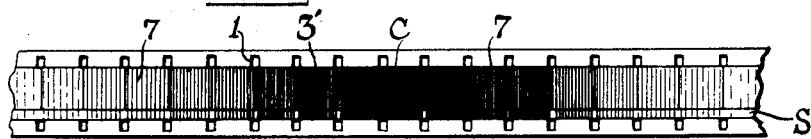
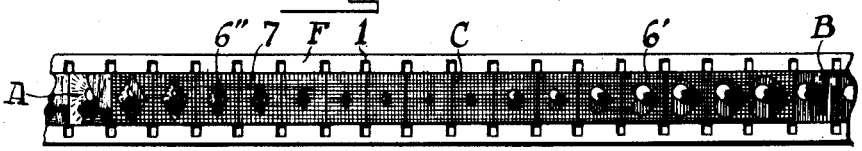
Inventor
Paul Favour
By M. M. Perrine
Attorney Feb. 10, 1931. P. FAVOUR 1,791,893
ACCESSORY FOR PHOTOGRAPHIC FILMS
Original Filed March 1, 1928  2 Sheets-Sheet 2
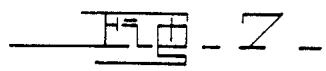
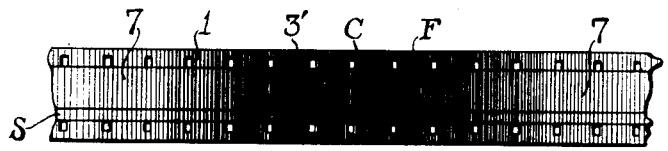
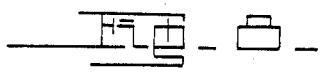
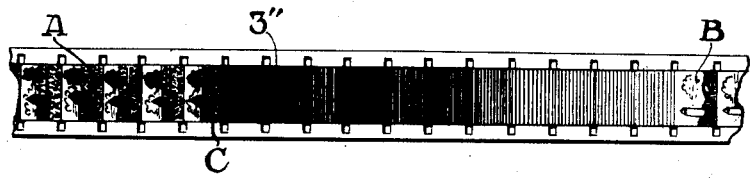
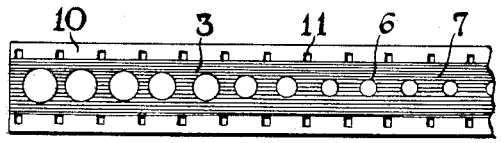
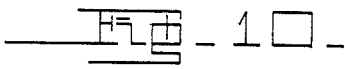
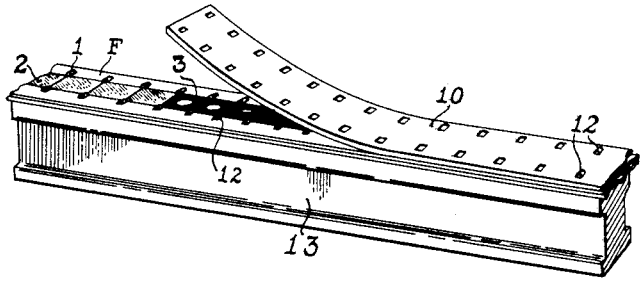
Inventor
Paul Favour
By [signature]
Attorney Patented Feb. 10, 1931

1,791,893

UNITED STATES PATENT OFFICE

PAUL FAVOUR, OF ROCHESTER, NEW YORK, ASSIGNOR TO EASTMAN KODAK COMPANY, OF ROCHESTER, NEW YORK, A CORPORATION OF NEW YORK

ACCESSORY FOR PHOTOGRAPHIC FILMS

Original application filed March 1, 1928, Serial No. 258,289. Divided and this application filed June 1, 1929. Serial No. 367,688.

This invention relates to cinematography and more particularly to an article and method useful in giving "fade in" and "iris" effects in projecting consecutive scenes originally taken under uniform exposure conditions, and in avoiding undesirable effects caused by the sudden transition from a photographic image of one density to an image of a different density.

While of general application, my invention is of particular use in the editing and splicing of amateur motion picture films of small dimension, where there is usually only a single print and elaborate taking and printing methods are not warranted; and where the successive scenes are frequently of varying quality and subject matter.

When a reel of such film has been assembled it is possible, by my invention, to determine from the complete projected film at what points the features mentioned would be most desirable, and to apply to the film as an otherwise completed film, or photoplay, a layer overlapping the junction of successive scenes and varying in its density and in "iris" effect, so as to change the character of the transition from one scene to the next.

The present application is a division of my application Serial No. 258,289 filed March 1, 1928 and relates to the article as sold, carrying the overlapping layer to be applied to the film.

Reference will now be made to the accompanying drawings wherein the same reference characters denote the same parts throughout, and in which Fig. 1 is a face view of a printed film as first assembled;

Figs. 2 and 3 are edge views of different forms of such a film, and embody my invention;

Figs. 4, 5, 6, 7, and 8 are face views of films embodying modifications of my invention;

Fig. 9 shows a strip carrying a transfer layer to be applied to a finished film;

Fig. 10 shows a layer being transferred from its carrier to the film.

My invention is preferably applied to a complete and assembled strip of film containing consecutive series of images. Such a film F is shown in Fig. 1, and has the usual edge perforations 1, and in the form shown a picture area 2 for each pair of perforations. There are two series of picture or image areas, A and B, each series constituting a scene and the several frames of each series being of substantially uniform density and contrast. The two subjects may be, however, very different so that there is an abrupt change at their junction C which is not pleasing when projected. The film may also carry sound records S and S' in registration along one edge of each scene and the density of the two records may be so different that there would be a sudden and displeasing noise effect at the junction point.

In such cases as this a gradual transition such as a "fade in" or "irising" of the picture is very desirable, and I obtain such an effect by applying a layer 3 preferably across the junction and extending over a continuous series of picture frames and over the sound record on each side of the junction. This layer is shown in edge view in Fig. 2, where the two series A and B are indicated as being on two pieces of film, the junction C being in the form of a splice. In the form shown in Fig. 3, the two picture series are on the same strip of film, the junction C' being merely indicated. In each case the film comprises a light transmitting support 4 of a composition including cellulose acetate, cellulose nitrate or other cellulosic compound, and a photographic emulsion layer 5 containing the images. The layer 3 may be applied either on the emulsion surface, as in Fig. 2, or on the support surface, as in Fig. 3.

This applied layer is of varying light transmission from frame to frame, and in the preferred form, shown in Fig. 4, this consists of a series of transparent areas 6 of the same shape, here shown as circular, surrounded by light retarding borders 7 covering the rest of each picture area, the areas 6 being large at the ends of the applied strip and becoming gradually smaller toward the junction where they may entirely disappear, and the density of the border areas gradually grows greater toward the junction where it may be opaque. This gives, when projected, an iris out and in of the central part of the picture area and a fade out and in of the border portion, and also causes a gradual diminution and increase of the sound without a sudden or displeasing sound or change of volume.

In the embodiment of Fig. 5, the iris-out feature is omitted and the strip 3' varies in density only, being densest at its middle portion.

In the form shown in Fig. 6, the transparent areas 6' are heart shaped over one series and grow smaller toward the junction, and the areas 6" on the other scene are diamond shaped. The border portions 7' are of uniform density, being preferably opaque throughout.

In each of the forms it is to be noted that the total light transmission of successive picture frames varies uniformly and increases from the ends to the center of the applied layer. The layer may extend over the entire width of the film, as in Fig. 11, or over the picture area only, as in the other figures.

The layer may extend over the end portion of one series only as in Fig. 7, where the layer 3" increases in density toward the junction C and stops there.

The form of the applied layer may vary widely. Preferably there will be supplied, as articles of manufacture and sale, strips of a support 10 such as paper having on one surface an easily stripped layer 3. The paper strip may have perforations 11 corresponding to perforations 1 and constituting a means for centering the areas 6 with the picture frames. The paper strips are wider than the transfer strip, and will be laid upon the film strip with the perforations in registry. The paper strip with the transfer material will be submitted to such treatment as may be necessary to cause the transfer material to remain on the film and the paper to be stripped therefrom. If desired the perforations may be registered by means of projections 12 carried by support 13.

One embodiment is a photographic stripping film of known type in which the transfer layer is of gelatine or collodion and carries a photographically formed image. These are well known in the art, typical examples being disclosed for use in motion picture color processes in the British patent to Kent 20,556 of 1912.

The transfer layer may be of the type commonly used for decalcomania.

The strip may also be in the form of a film support similar to the film to which it is to be applied and carrying in the gelatine layer images of the form and properties already described. These may be dye images formed by known imbibition or dye toning processes, or may be photographically formed silver images or photographically formed colored salts produced by any of the well known methods. Such a strip would be applied in the same way as is illustrated in Fig. 9, except that the support would not be stripped from the varying image carrying layer.

I consider as included in my invention all other modifications and equivalents as may fall within the scope of the appended claims.

Having thus described my invention, what I claim as new and desire to secure by Letters Patent is:

1. As an article of manufacture and sale, a strip of material comprising a support and a stripping layer carried by said support, the said stripping layer being of a size sufficient to cover completely a series of picture areas on a motion picture film and varying in the total light transmission of an area corresponding to a picture area.

2. As an article of manufacture and sale, a strip of material for use in applying a layer to a motion picture band having perforations on its borders and image areas in definite relation to its areas, said strip comprising a support perforated to correspond to the perforations of the band and a stripping layer of a type adapted to adhere to the band and to be readily stripped from the support, the stripping layer being of a size sufficient to cover completely a series of image areas and varying in the total light transmission of successive areas corresponding to successive picture areas.

Signed at Rochester, New York this 29th day of May, 1929.

PAUL FAVOUR.